United States Patent [19]

Chappell

[11] Patent Number: 4,813,759
[45] Date of Patent: Mar. 21, 1989

[54] FIBER OPTIC HIGH AND LOW LEVEL ALARMS

[75] Inventor: Robert E. Chappell, Lancaster, Ohio

[73] Assignee: The Babcock & Wilcox Company, New Orleans, La.

[21] Appl. No.: 526,186

[22] Filed: Aug. 25, 1983

[51] Int. Cl.⁴ .............................................. G02B 6/26
[52] U.S. Cl. ................................................. 350/96.16
[58] Field of Search ......................... 350/96.15, 96.16; 250/227

[56] References Cited

U.S. PATENT DOCUMENTS

| | | | |
|---|---|---|---|
| 4,341,438 | 7/1982 | Seki et al. | 350/96.16 |
| 4,447,118 | 5/1984 | Mulkey | 350/96.16 |
| 4,451,730 | 5/1984 | Brogardh et al. | 250/227 |

FOREIGN PATENT DOCUMENTS 0028029  2/1980  Japan ................................. 350/96.16

Primary Examiner—William L. Sikes
Assistant Examiner—Akm E. Ullah
Attorney, Agent, or Firm—Vytas R. Matas; Robert J. Edwards

[57] ABSTRACT

A system which utilizes optic fibers for the transmission of light from a process measuring device to an alarm actuating circuit is disclosed. An optic fiber (14) is positioned adjacent each process monitoring location and transmits light therefrom to a remotely located matte screen (12) from which it is reflected to a pair of optic fibers (16, 18). The optic fibers (16, 18) transmit the light of optic diodes (20, 22), respectively, which are selectively actuated in response to the color of the light being transmitted and which, in turn, selectively actuate an alarm circuit connected thereto.

5 Claims, 1 Drawing Sheet

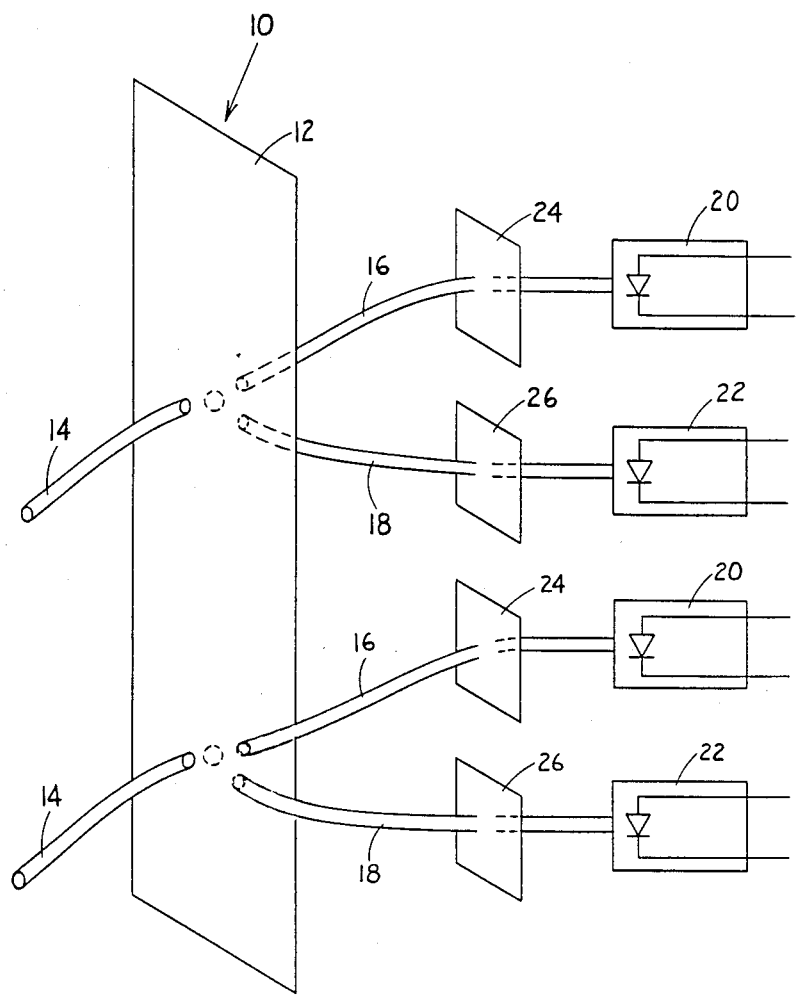

FIBER OPTIC HIGH AND LOW LEVEL ALARMS

TECHNICAL FIELD

The present invention relates generally to an alarm system which is actuated when a process variable varies from a pre-determined range and more particularly to an alarm system which utilizes optic fibers for the detection and transmission of light from the process measuring device to the alarm actuating means.

BACKGROUND ART

The level of a liquid within a tube or against a window has been used for many years to provide a visual indication of a process variable, etc. Some examples of the foregoing are a thermometer for measuring temperature, a manometer for measuring pressure and sight glasses for determining liquid levels within a container. The latter are used in steam boiler installations to provide a visual indication of the water level within the boiler. The foregoing devices are adequate if the operator is near the boiler, however, control rooms for such boiler installations are now being located remotely from the boiler. Thus, systems had to be developed for the transmission of such water level measurements to the remote control rooms. These systems typically utilize lenses, beam-splitters, etc. to transmit light, which passes through or is reflected from these measuring devices, to a viewing screen within the control room. As such, these systems are complex and relatively expensive because of the apparatus required to detect and transmit the light from the measuring device to the control room.

Because of the foregoing, it has become desirable to develop a system which utilizes dependable, inexpensive apparatus for the transmission of light from the measuring device to the viewing screen and which will also provide for the actuation of an alarm(s) if the process variable being monitored varies from a predetermined range.

SUMMARY OF THE INVENTION

The present invention solves the aforementioned problems associated with the prior art as well as other problems by using optic fibers for the transmission of light from the measuring device to a viewing screen within the control room and from the viewing screen to optic diodes which control the actuation of alarm devices. An optic fiber is positioned adjacent each monitoring location, e.g., the bottom port and the top port of a steam boiler. The foregoing optic fiber transmits the light, e.g., either red or green light, which passes through the measuring device for that particular monitoring location to a matte screen located within the control room. A pair of optic fibers is dedicated for use with each of the foregoing optic fibers and is positioned relative to the screen to detect the light reflected by the screen and transmit this light to optic diodes which are provided with filters to permit the selective actuation of same depending upon the color of the light being transmitted. The optic diodes selectively control the actuation of alarm(s) in response to the condition of the process variable being monitored.

BRIEF DESCRIPTION OF THE DRAWING

The single FIGURE of the drawing is a schematic diagram representing the apparatus of the invention.

DESCRIPTION OF THE PREFERRED EMBODIMENT

Referring now to the drawing where the illustration is for the purpose of describing the preferred embodiment of the present invention and is not intended to limit the invention thereto, the FIGURE is a schematic diagram of an alarm system using fiber optics for transmission and detection purposes. This alarm system 10 uses a matte screen 12 for reflecting light transmitted by an optic fiber 14 to a pair of optic fibers 16 and 18, which can be located either on the same side of the matte screen 12 as optic fiber 14 or on the opposite side of the screen 12. The opposite ends of the optic fibers 16, 18 are connected respectively to optic diodes 20, 22 which are provided with a green filter 24 and a red filter 26, respectively. The outputs of the optic diodes 20, 22 can be used to actuate alarms, etc., as will be hereinafter described.

The optic fiber 14 is typically positioned so as to be capable of transmitting light from a measuring device (not shown), such as a gauge for measuring water within a steam boiler. Thus, for such a boiler installation, an optic fiber 14 would be dedicated for use with the bottom port, and another optic fiber 14 would be used exclusively for the top port. In addition, each of the foregoing optic fibers 14 would have a pair of optic fibers 16 and 18 dedicated for use in association therewith. Typically, in such an installation, the optic fiber 14 associated with the port being monitored transmits either red or green light depending upon the water level at that port. For example, if the water level is below the bottom port or below the top port, a red light will be transmitted by the optic fiber 14 associated with that port to the matte screen 12. Similarly, if the water level is above the bottom port or above the top port, a green light will be transmitted by the optic fiber 14 associated with that port to the screen 12. The end of each optic fiber 14 that is adjacent the matte screen 12 is positioned so as to "project" the foregoing transmitted light onto the screen 12 so as to form a "spot" thereon. A pair of optic fiber 16 and 18 is dedicated for use with each optic fiber 14 and is positioned relative to the screen 12 and the "spot" formed thereon by its associated optic fiber 14 so as to detect the light reflected by the screen 12 and transmit the light to the optic diodes 20 and 22 associated therewith. If green light is being reflected by the matte screen 12, the optic fibers 16 and 18 associated with the optic fiber 14 transmitting the green light will, in turn, transmit the green light to their associated respective optic diodes 20 and 22, however, only optic diode 20 will be actuated since the green light can pass through the green filter 24 associated therewith but is blocked by the red filter 26 associated with optic diode 22. Conversely, if red light is being reflected by the screen 12, the optic fibers 16 and 18 associated with the optic fiber 14 transmitting the red light will, in turn, transmit the red light to their respective optic diodes 20 and 22, however, only optic diode 22 will be actuated since the red light can pass through the red filter 26 associated therewith but is blocked by the green filter 24 associated with optic diode 20. Depending upon which optic diode 20, 22 is actuated, alarms can be selectively actuated to indicate the presence or absence of a particular condition, such as high or low water level within a boiler.

From the foregoing, it is apparent that even though only two monitoring locations were considered, i.e., the bottom port and the top port of a boiler, any number of monitoring locations could be employed and each monitoring location would be provided with an optic fiber 14, and each optic fiber 14 would have associated therewith a pair of optic fibers 16 and 18 along with their respective optic diodes 20 and 22 and filters 24 and 26. In addition, it should be noted that the outputs of each pair of optic diodes 20, 22 associated with a specific monitoring location could be connected to the input to an "OR" gate or circuit (not shown) which would actuate an alarm when both of the optic diodes 20, 22 are unactuated thus indicating a fault condition, i.e., the loss of light at a specific monitoring location. Thus, this alarm system 10 can monitor any number of specific measuring locations and is failsafe in its operation.

Certain modifications and improvements will occur to those skilled in the art upon reading the foregoing description. It will be understood that all such improvements and modifications have been deleted herein for the sake of conciseness and readability, but are properly within the scope of the following claims.

I claim:

1. An alarm control system for transmitting different color light signals from a first monitoring location depending on the condition of the monitoring location to a second alarm actuating location comprising, a first optic fiber having a pair of opposite ends, said one end being adjacent a source of different color light eminating from a measuring device at the first monitoring location, an illumination screen adjacent said other opposite end of said first optic fiber and positioned so as to have a spot formed on said screen illuminated by the light transmitted by said first optic fiber from the light source of the monitoring device, a pair of optic fibers each having one end thereof positioned adjacent said spot formed on said illuminated portion of said illumination screen to transmit the light color of the formed spot to the second location along said pair of optic fibers and switching means connected to the other end of each of said pair of optic fibers with each switching means responsive to different color light signals to actuate an alarm condition.

2. The system as defined in claim 1 wherein said first optic fiber and said pair of optic fibers are located on the same side of said illumination screen.

3. The system as defined in claim 1 wherein said first optic fiber is located on one side of said illumination screen and said pair of optic fibers are located on the other side of said illumination screen.

4. The system as defined in claim 1 further including alarm means connected to said switching means and selectively actuatable by said switching means in response to the color of light being transmitted by said one or more optic fibers.

5. The system as defined in claim 1 further including means for detecting the loss of light at the first location, said detecting means being actuatable by said switching means when the transmission of light by said one or more optic fibers is interrupted.

* * * * *